United States Patent
Chen et al.

(10) Patent No.: US 7,103,244 B2
(45) Date of Patent: Sep. 5, 2006

(54) MINIATURIZED RECONFIGURABLE DWDM ADD/DROP SYSTEM FOR OPTICAL COMMUNICATION SYSTEM

(75) Inventors: Ray T. Chen, Austin, TX (US); William W. Morey, Rancho Palos Verdes, CA (US)

(73) Assignee: Finisar Corporation, Sunnyvale, CA (US)

( * ) Notice: Subject to any disclaimer, the term of this patent is extended or adjusted under 35 U.S.C. 154(b) by 0 days.

(21) Appl. No.: 10/097,680

(22) Filed: Mar. 14, 2002

(65) Prior Publication Data

US 2002/0131692 A1 Sep. 19, 2002

Related U.S. Application Data

(60) Provisional application No. 60/276,182, filed on Mar. 15, 2001.

(51) Int. Cl.
G02B 6/28 (2006.01)

(52) U.S. Cl. .............................. 385/24; 385/16; 385/20; 385/140; 398/79

(58) Field of Classification Search .................... 385/14, 385/16–24, 40, 48, 140; 398/67, 72, 79, 85
See application file for complete search history.

(56) References Cited

U.S. PATENT DOCUMENTS

| | | | | |
|---|---|---|---|---|
| 5,500,913 A | 3/1996 | Allen et al. | .................... | 385/48 |
| 5,653,008 A | * 8/1997 | Sim et al. | .................. | 385/16 X |
| 5,657,155 A | 8/1997 | Cheng | ......................... | 359/341 |
| 5,703,708 A | 12/1997 | Das et al. | .................... | 359/140 |
| 5,708,265 A | 1/1998 | Poole | ...................... | 250/227.14 |
| 6,115,519 A | 9/2000 | Espindola et al. | ............. | 385/43 |
| 6,175,671 B1 | 1/2001 | Roberts | ....................... | 385/14 |
| 6,301,425 B1 | 10/2001 | Espindola et al. | .......... | 385/140 |
| 6,311,004 B1 | 10/2001 | Kenney et al. | .............. | 385/130 |
| 6,341,024 B1 | 1/2002 | Jeong | ......................... | 359/130 |
| 6,351,329 B1 | 2/2002 | Greywall | ..................... | 359/290 |
| 2003/0175030 A1 | * 9/2003 | Chen et al. | ................... | 398/85 |

* cited by examiner

*Primary Examiner*—Phan T. H. Palmer
(74) *Attorney, Agent, or Firm*—Workman Nydegger (57) ABSTRACT

A DWDM add/drop system for use in optical communication system is disclosed. Using semiconductor fabrication techniques, a plurality of waveguide arrays and signal carriers are substantially symmetrically arranged about an optical axis of the system. Electrode heaters are provided proximate junctions created at the intersections of selected waveguides. Using the heaters, portions of optical signals may be redirected to other waveguides. In addition, the heaters may be used to attenuate or otherwise modify signals in the waveguides. The waveguide arrays are arranged such that a plurality of signal processing operations may be performed substantially simultaneously. In a preferred embodiment, the switches and waveguide arrays are coupled with a light focusing device and a dispersion apparatus to form a switched, combined multiplexer/demultiplexer having signal attenuation and modification capabilities.

30 Claims, 4 Drawing Sheets

MINIATURIZED RECONFIGURABLE DWDM ADD/DROP SYSTEM FOR OPTICAL COMMUNICATION SYSTEM

RELATED APPLICATIONS

This application claims priority from U.S. Provisional Patent Application Ser. No. 60/276,182, filed Mar. 15, 2001, and entitled "Miniaturized Reconfigurable DWDM Add/Drop System for Optical Communication Systems."

This application claims priority from co-pending application Ser. No. 09/999,054 now U.S. Pat. No. 6,510,260, filed Nov. 1, 2001 entitled "NxN Optical Switching Devices Based on Thermal-Optics Induced Total Internal Reflection Effect", which claims priority from provisional Application Ser. No. 60,259,446, filed Jan. 2, 2001.

This application claims priority from co-pending application Ser. No. 10/097,751, filed Mar. 14, 2002 entitled "Combined Multiplexer and Demultiplexer for Optical Communication Systems", which claims priority from U.S. Provisional Patent Application Ser. No. 60/276,182, filed Mar. 15, 2001.

This application claims priority from co-pending application Ser. No. 10/098,050, filed Mar. 14, 2002 entitled "Dynamic Variable Optical Attenuator and Variable Optical Tap", which claims priority from U.S. Provisional Patent Application Ser. No. 60/276,182, filed Mar. 15, 2001.

TECHNICAL FIELD

The present invention is related to optical communications systems for wavelength division demultiplexing, optical signal switching and wavelength division multiplexing and, more particularly, to an optical communication system having a waveguide array for multiplexing and demultiplexing multiple wavelength signals in combination with an array of optical switches which also functions as a variable optical attenuator.

BACKGROUND OF THE INVENTION

The increased demand for data communication and the remarkable growth of the Internet have resulted in increased demand for communication capability within metropolitan areas. There has also been an equally large increase in demand for communication capability between large metropolitan areas. Optical communication systems using a network of fiber optic cables are being developed and installed to meet the increased demand.

The data transmission capacity of fiber optic cables and fiber optic networks has been substantially increased as a result of wavelength division multiplexing (WDM) and dense wavelength division multiplexing (DWDM). Within WDM and DWDM systems, optical signals assigned to different wavelengths are combined (multiplexed) into a multiple wavelength signal for transmission over a single fiber optic cable or other suitable waveguide. A typical DWDM system modulates multiple data streams on to different portions of the light spectrum. For example, one data stream may have an assigned wavelength of 1534 nanometers (nm) and the next data stream may have an assigned wavelength of 1543.8 nm. The required spacing between assigned wavelengths is generally established by International Telecommunications Union (ITU) specifications. These spacings include 0.4 µm and 0.8 µm.

Demultiplexing, the reverse process of multiplexing, typically refers to separation of a multiple wavelength or multiwavelength signal transmitted by a single fiber optic cable or other suitable waveguide into constituent optical signals for each wavelength. Each optical signal may be further processed to obtain the associated data stream or other information. Both multiplexing and demultiplexing are required for satisfactory operation of WDM and DWDM systems. Multiplexing and demultiplexing of optical signals in conventional DWDM systems are typically performed by two separate relatively expensive and often difficult to manufacture optical devices.

Various types of optical switches and techniques are currently used in optical communication systems. Many currently available optical switches are based upon optoelectric and electrooptic conversion of light signals and electrical signals within the associated optical switch. One type of presently available optical switch includes a matrix of thermooptic switching elements interconnected by waveguides formed on a silica substrate. Switching of light signals is accomplished by the use of thin film heaters to vary the temperature of the switching elements. Electrical circuits are also provided to supply switching current to the heaters. A heat sink may be provided to dissipate heat caused by the switching operations. One example of such switches is shown in U.S. Pat. No. 5,653,008.

Various types of optical signal amplifiers, wavelength division demultiplexers, optical switches, wavelength division multiplexers and techniques are currently used in optical communication systems. Optical signal amplifiers, wavelength division multiplexers and demultiplexers and other components associated with optical communication systems that transmit multiple wavelength light signals typically function best when respective signal levels for the multiple wavelength optical signals are substantially equal with each other. A substantial variation in signal level of multiple wavelength optical signals can result in an undesirable signal to noise ratio and resulting poor performance.

Multiple wavelength optical signals are normally collectively amplified by a light amplifier. The amplification factor of many light amplifiers is dependent upon the wavelength of each optical signal. Therefore, the amplification factors for multiple wavelength optical signals varies depending on the specific wavelength of each signal. The resulting difference between signal levels for multiple wavelength optical signals amplified by a single amplifier is often relatively small. However, when a large number of light amplifiers (ten or more) are used in a fiber optic communication system, the variation in signal levels becomes cumulative and may result in unsatisfactory lowering of associated signal to noise ratios. Therefore, variable optical attenuators are often provided at the input stage and/or output stage of light amplifiers in both large metropolitan communication systems and long distance fiber optic communication systems to adjust signal levels or intensity of multiple wavelength light signals to maintain a desired signal to noise ratio.

Variable optical attenuators are often included in optical communication systems to maintain a desired signal level for each optical signal or wavelength. Examples of variable optical attenuators (VOA) include natural density filters that are often used to suppress the amount of light depending on wavelength characteristics. Other variable optical attenuators include mechanical devices that position a glass substrate so that light signals may be attenuated by varying the position of the glass substrate. Still other variable optical attenuators attenuate light signals by rotating the polarization of each light signal as it passes through a Faraday element.

SUMMARY OF THE INVENTION

In accordance with teachings of the present invention, a system is provided for demultiplexing, switching, attenuating and multiplexing multiple wavelength optical signals using a waveguide array, an array of optical switches and a diffraction grating. An array of waveguides formed in accordance with teachings of the present invention in combination with a lens assembly and a diffraction grating may function simultaneously as both a wavelength division multiplexer and a wavelength division demultiplexer. Optical switches formed in accordance with teachings of the present invention may be used to both switch optical signals and attenuate the respective signal level of optical signals flowing through the switches.

In another aspect, the present invention provides a communication system for multiple wavelength signals including a combined multiplexer/demultiplexer operable to substantially simultaneously multiplex and demultiplex multiple wavelength optical signals. The communication system preferably also includes an array of optical switches operable to.

In a further aspect, the present invention provides a signal processing system having a plurality of waveguide arrays substantially symmetrically disposed relative to an optical axis of the system and an array of optical switches operable to selectively direct optical signal carried by the waveguides. The plurality of waveguides are preferably operable to perform at least one signal processing operation on optical signal reflected from a dispersion apparatus.

Technical benefits of the present invention include providing a communication system or network with substantially reduced insertion loss and substantially reduced manufacturing costs as compared to a conventional communication system or network having a wavelength division demultiplexer, an array of optical switches, a corresponding array of variable optical attenuators, and a wavelength division multiplexer. A single device having an array of waveguides formed in accordance with teachings of the present invention may function simultaneously as a multiple wavelength optical signal multiplexer and demultiplexer that reduces the number of multiplexers and demultiplexers required for a given number of optical signals by one-half.

An array of optical switches formed in accordance with teachings of the present invention may function to switch and attenuate multiple wavelength optical signals as well as eliminate the requirement for separate variable optical attenuators. Therefore, a communication system or network formed in accordance with teachings of the present invention will have approximately one-half the number of components associated with a conventional communication system or network having the same performance characteristics with respect to multiple wavelength optical signals. For example, a conventional communication system or network capable of switching forty channels would normally require a DWDM multiplexer, a DWDM demultiplexer, forty (40) 2×2 optical switches and forty (40) variable optical attenuators. A communication system capable of switching forty (40) optical signals formed in accordance with the teachings of the present invention will require only one (1) bi-directional DWDM multiplexer/demultiplexer and an array of forty (40) optical switches.

The quality of a light signal is determined by the ratio between the signal level and the intensity of noise associated with the light signal. This ratio is commonly referred to as the signal to noise ratio (SNR). Optical switches formed in accordance with teachings of the present invention may be satisfactorily used to adjust the intensity or signal level of multiple wavelength light signals communicated through a fiber optic system to establish the desired signal to noise ratio for optimum performance of amplifiers, bi-directional wavelength division multiplexers/demultiplexers and other components of an optical communication system.

A communication system or network formed in accordance with teachings of the present invention may be satisfactorily used with single mode, multiple mode, or a combination of single mode and multiple mode fibers as input and output fibers and to form fiber or waveguide arrays. A combined multiplexer/demultiplexer formed in accordance with teachings of the present invention may use the same imaging and beam optics, diffraction grating and mechanical packaging to both multiplex and demultiplex multiple wavelength optical signals. Technical benefits of the present invention include substantial savings of cost, space and weight. The present invention is particularly advantageous when more than one multiplexer or demultiplexer is required at the same location in an optical communication system or network. For some applications multiple wavelength optical signals from different channels of a principle fiber line may be separated, dropped, added or cross connected and then recombined into a multiple wavelength optical signal without requiring the use of separate multiple wavelength multiplexers and multiple wavelength demultiplexers.

BRIEF DESCRIPTION OF THE DRAWINGS

A more complete and thorough understanding of the present invention and its advantages may be acquired by referring to the following description taken in conjunction with the accompanying drawings, in which like reference numbers indicate like features, and wherein.

DETAILED DESCRIPTION OF THE INVENTION

Preferred embodiments of the present invention and its advantages are best understood by referring to FIGS. 1 through 8 of the drawings, like numerals being used for like and corresponding parts of the various drawings.

The terms "optical signal or signals" and "light signal or signals" are used in this application to include the full range of all electromagnetic radiation which may be satisfactorily used to communicate information using a waveguide and/or fiber optic cable. A bi-directional wavelength division multiplexer/demultiplexer incorporating teachings of the present invention may be satisfactorily used with such optical signals. An array of optical switches incorporating teachings of the present invention may be satisfactorily used to both switch and attenuate or reduce the intensity or signal level of such optical signals. Signal level or intensity may also be referred to as "optical power."

The terms "bi-directional wavelength division multiplexer/demultiplexer" and "combined multiplexer/demultiplexer" are used in this application to refer to an optical device that may be satisfactorily used to simultaneously multiplex multiple wavelength optical signals and demultiplex multiple wavelength optical signals. A bi-directional wavelength division multiplexer/demultiplexer formed in accordance with teachings of the present invention may also be used to only demultiplex multiple wavelength optical signals or multiplex multiple wavelength optical signals as desired for a specific communication system.

The term "waveguide" is used in this application to include the full range of optical devices that may be satisfactorily used to communicate optical signals. A waveguide typically includes a core formed from a first optical material and disposed in a channel formed in a second optical material. A fiber optic cable is one example of a specific type of waveguide. However, waveguides satisfactory for use with the present invention may have various configurations other than fiber optic cables and cores disposed in a channel.

Various features of the present invention will be described with respect to an optical communication system or network such as communication system 20 shown in FIG. 1 and communication system 120 shown in FIG. 8. An optical communication system or network formed in accordance with teachings of the present invention may be satisfactorily used in long distance fiber optic communication systems (not expressly shown) or large metropolitan area optical communication systems (not expressly shown). Various features of the present invention will be described with respect to a multiple wavelength signal having four spectral components ($\lambda_1$, $\lambda_2$, $\lambda_3$ and $\lambda_4$). However, the present invention may be used with multiple wavelength optical signals having any number of spectral components or wavelengths.

Figure 1:
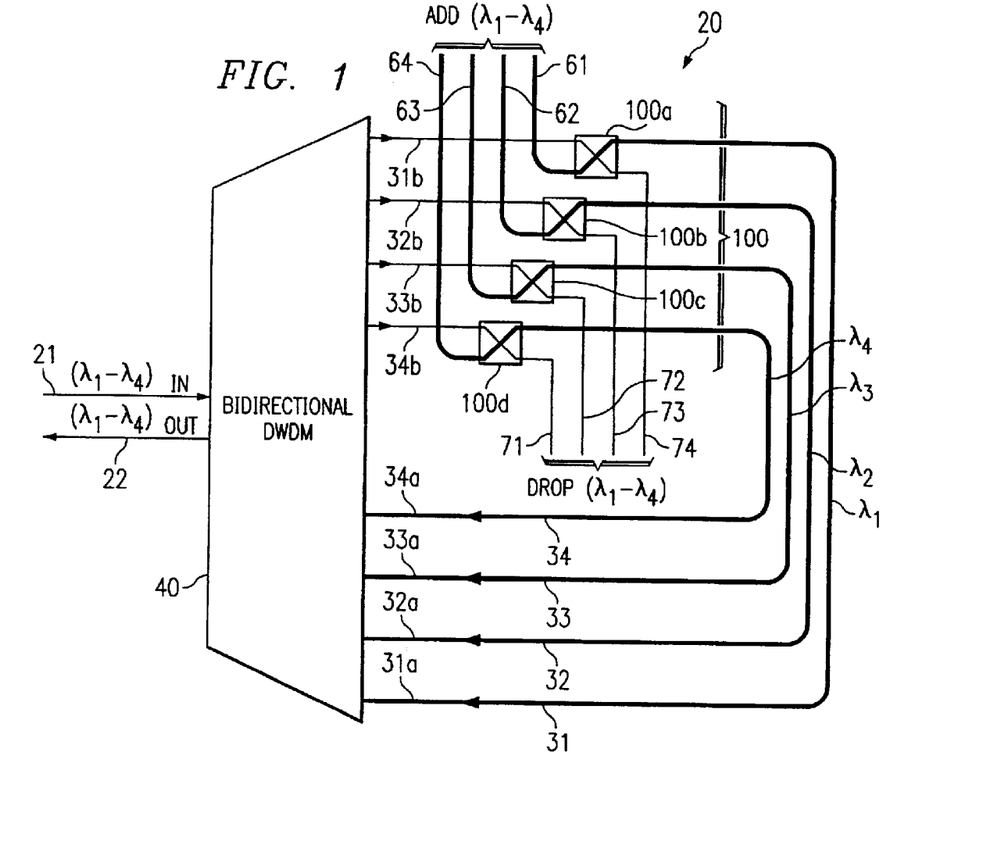
FIG. 1 is a schematic drawing showing an optical communication system formed in accordance with teachings of the present invention including a bi-directional wavelength division multiplexer/demultiplexer and an array of optical switches which also function as variable optical attenuators.

For the embodiment of the present invention shown in FIG. 1, communication system 20 preferably includes a plurality of signal carriers, such as input fiber optic cable 21 and output fiber optic cable 22. Wavelength division multiplexing (WDM) techniques may be used to allow signal carriers or fiber optic cables 21 and 22 to carry multiple optical signals at various wavelengths, substantially increasing the efficiency of signal carriers or fiber optic cables 21 and 22. Dense wavelength division multiplexing (DWDM) techniques have been developed to allow existing fiber optic networks to better satisfy increased demand for communication capabilities.

Various features of the present invention will be described with respect to communicating an optical signal having at least four wavelengths ($\lambda_1$, $\lambda_2$, $\lambda_3$ and $\lambda_4$). Respective amplifiers (not expressly shown) may be coupled with input signal carrier or fiber optic cable 21 and output signal carrier or fiber optic cable 22. Communication system 20 preferably includes bi-directional wavelength division multiplexer/demultiplexer 40 and at least one array of optical switches 100. For purposes of illustrating various features of the present invention optical switches 100 have been designated 100a, 100b, 100c and 100d. A plurality of fiber optic cables and/or waveguides 31, 32, 33 and 34 are preferably coupled with bi-directional wavelength division multiplexer/demultiplexer 40 and respective optical switches 100.

Bi-directional wavelength division multiplexer/demultiplexer 40 may include two or more waveguide arrays or sets of waveguides. For the embodiment of the present invention shown in FIGS. 7A, 7B and 8, the first waveguide array has been designated 51. The second waveguide array has been designated 52. For purposes of describing various features of the present invention, the portion of fiber optic cables and/or waveguides 31–34 used to couple optical switches 100a, 100b, 100c, and 100d with first waveguide array 51 are designated 31a, 32a, 33a and 34a. The portion of fiber optic cables and/or waveguides 31–34 which couple optical switches 100a, 100b, 100d and 100c with second waveguide array 52 are designated 31b, 32b, 33b and 34b. Arrows have been added to show the direction of optical signal travel through fiber optic cables and/or waveguides 31, 32, 33 and 34. See FIGS. 1 and 8.

Input signal carrier or fiber optic cable 21 preferably provides multiple wavelength signal ($\lambda_1$, $\lambda_2$, $\lambda_3$, $\lambda_4$) to bi-directional wavelength division multiplexer/demultiplexer 40. Bi-directional wavelength division multiplexer/demultiplexer 40 is preferably operable to demultiplex the multiple wavelength signal into its individual spectral components. During the demultiplexing process, the optical signal corresponding with $\lambda_1$ is preferably directed through fiber optic cable and/or waveguide 31b to optical switch 100a. In a similar manner optical signals corresponding with wavelengths $\lambda_2$, $\lambda_3$ and $\lambda_4$ are preferably directed by fiber optic cables and/or waveguides 32b, 33b and 34b to respective optical switches 100b, 100c and 100d.

As discussed later in more detail, optical switches 100 may direct the respective optical signals ($\lambda_1$, $\lambda_2$, $\lambda_3$ or $\lambda_4$) to respective drop ports (not expressly shown) coupled with fiber optic cables designated 71, 72, 73 and 74 or to respective fiber optic cables and/or waveguides 31a, 32a, 33a and 34a. Fiber optic cables 61, 62, 63 and 64 may supply optical signals having respective wavelengths $\lambda_1$, $\lambda_2$, $\lambda_3$ and $\lambda_4$ to add ports (not expressly shown) at respective optical switches 100a, 100b, 100c and 100d.

Figure 8:
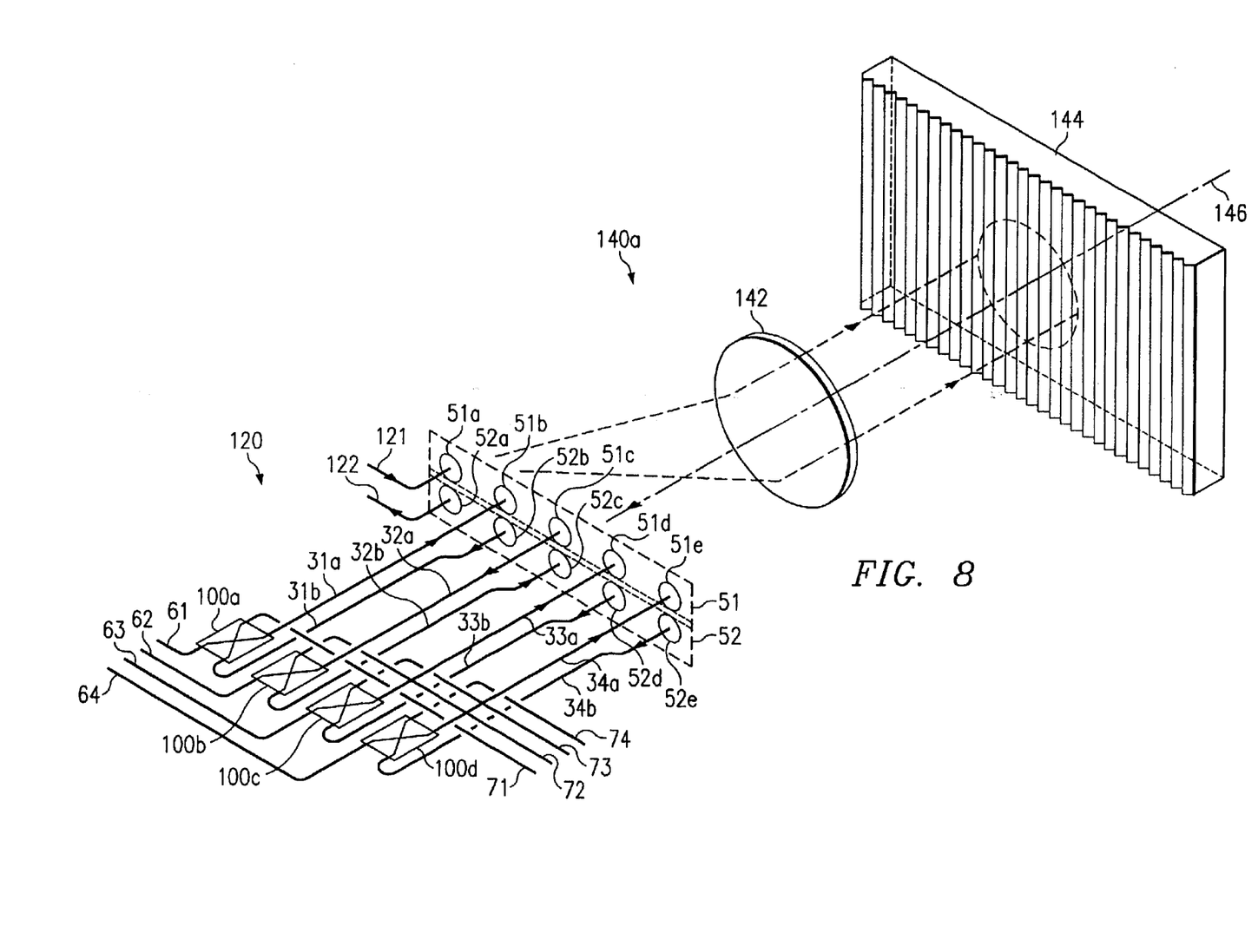
FIG. 8 is a schematic drawing showing another embodiment of an optical communication system formed in accordance with teachings of the present invention including a bi-directional wavelength division multiplexer/demultiplexer and an array of optical switches which also function as variable optical attenuators.

The portions of communication system 20 shown in FIG. 1 and communication system 120 shown in FIG. 8 include respective input and output fiber optic cables, four add ports and four drop ports. However, various communication systems may be formed in accordance with teachings of the present invention using bi-directional wavelength division multiplexer/demultiplexers and multiple arrays of optical switches having any number of input and output channels, add ports and drop ports.

Figure 2:
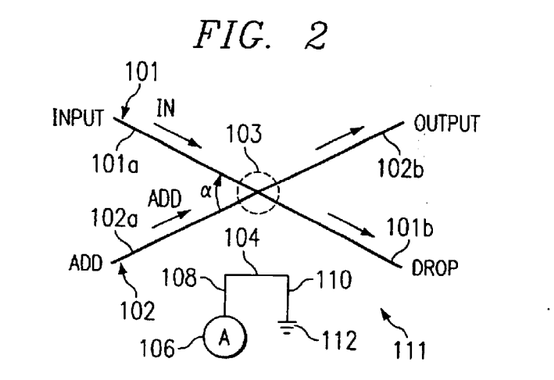
FIG. 2 is a schematic drawing showing a plan view with portions broken away of a 2×2 optical switch satisfactory for use with the optical communication system of FIG. 1.

FIG. 2 is a schematic drawing showing a plan view of one example of an optical switch incorporating teachings of the present invention. Optical switches 100a, 100b, 100c and 100d have substantially the same design as the optical switch depicted in FIG. 2. For the embodiment shown in FIG. 2, optical switch 111 preferably includes first waveguide 101 and second waveguide 102. Each waveguide 101 and 102 also includes respective input ends "a" and output ends "b". Although various features of the present invention will be described with respect to an optical signal traveling from input end "a" to output end "b" of a waveguide, an optical switching device formed in accordance with teachings of the present invention may be satisfactorily used to switch or redirect optical signals traveling in either direction through the waveguide.

For the embodiments of the present invention represented by communication systems 20 and 120, input end 101a of each optical switch 100a, 100b, 100c and 100d is preferably coupled with respective fiber optic cables and/or waveguides 31b, 32b, 33b and 34b. Output end 102a of each optical switch 100a, 100b, 100c and 100d is preferably coupled with respective fiber optic cables and/or waveguides 31a, 32a, 33a and 34a. Input end 102a of each optical switch 100a, 100b, 100c and 100d is preferably coupled with a respective add port and fiber optic cable 61, 62, 63 and 64. Output end 101b of each optical switch 100a, 100b, 100c and 100d is preferably coupled with a respective drop port and fiber optic cables 71, 72, 73 and 74.

For embodiments of the present invention represented by communication systems 20 and 120, optical signals may travel from input end 101a through first waveguide 101 to output end 101b or may be directed by switch 111 to travel through second waveguide 102 to an output port (not expressly shown) coupled with output end 102b. Except for insertion losses and other minor losses associated with an optical signal traveling through a waveguide, the optical power level of an optical signal entering input end 101a is approximately equal to the total optical power level exiting from output end 101b plus output end 102b. Except for insertion losses and other minor losses associated with transmission of an optical signal through a waveguide, the total optical energy level or power level of optical signals communicated through optical switch 111 remains substantially constant.

An add port (not expressly shown) may be coupled with input end 102a of second waveguide 102. Add signals will generally travel from input end 102a through second waveguide 102 to the output port (not expressly shown) coupled with output end 102b. A drop port (not expressly shown) may be coupled with output end 101b of each of first waveguide 101. Fiber optic cable 71, 72, 73 and 74 are preferably coupled with respective drop ports.

Angle α defined by intersection or junction 103 between first waveguide 101 and second waveguide 102 is preferably selected to be in the range of approximately two degrees (2°) and eight degrees (8°). For at least one application, for example using Silicon Oxide (SiO), angle α is preferably equal to approximately three degrees (3°). For some polymers, angle α is preferably equal to approximately six degrees (6°). By forming optical switch 111 with angle α having a value between approximately two degrees (2°) and eight degrees (8°), an optical signal may travel through first waveguide 101 from input end 101a to output end 101b without any significant perturbation or reflection at intersection or junction 103 unless the index of refraction at junction 103 is changed in accordance with teachings of the present invention. The index of refraction at junction 103 may be changed by thermooptic, electrooptic, magnetooptic, or acoustooptic effects.

Electrode heater 104 is preferably disposed adjacent to junction or intersection 103 to produce desired thermooptic effects. Electrode heater 104 may be formed from various types of materials including nickel chrome alloys (NiCr) and chromium gold (Cr/Au), and other metal and alloys. Electrode heater 104 may be used to apply a desired amount of heat to junction or intersection 103 to direct or deflect optical signals from first waveguide 101 to second waveguide 102 or from second waveguide 102 to first waveguide 101. As discussed later in more detail, electrode heater 104 may also be used to attenuate the signal level of optical signals in waveguides 101 and 102.

Figure 6:
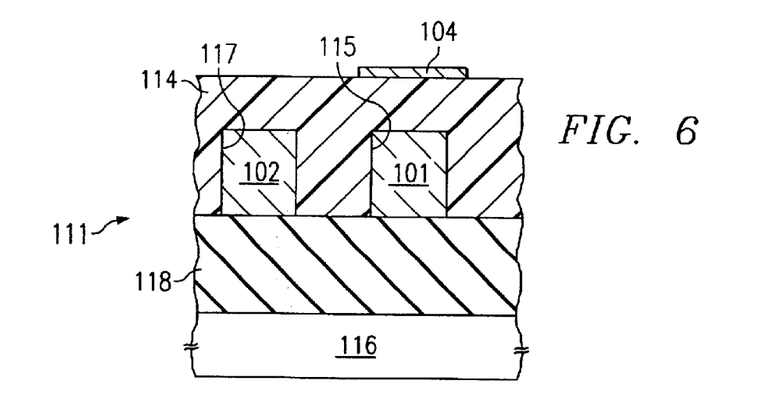
FIG. 6 is a schematic drawing in section taken along line 6—6 of FIG. 5.

When electrical current is supplied to electrode heater 104, heating will occur in a cladding layer 114 disposed between electrode heater 104 and junction 103, see FIG. 6, to produce a desired thermooptic effect such as attenuation of an optical signal and/or switching of an optical signal. For example, an optical signal corresponding with wavelength $\lambda_1$ may be directed to input end 101a of waveguide 101. An appropriate amount of electrical current may be supplied to electrode heater 104 to provide a desired amount of heating at intersection or junction 103 to direct at least a portion of the optical signal corresponding with wavelength $\lambda_1$ from waveguide 101 to waveguide 102 and output end 101b. Attenuation of optical signals will be discussed in more detail with respect to the graphs shown in FIGS. 3 and 4.

The configuration and location of electrode heater 104 allows selected heating of portions of waveguides 101 and 102 to form what may be considered an imaginary mirror disposed along a longitudinal center line of intersection 103. Heating cladding layer 114 and portions of waveguides 101 and 102 at intersection 103 will permit a change in the refractive index such that total internal refraction may be achieved. In effect, heating caused by electrode heater 104 at or above a selected value will provide an imaginary mirror at intersection 103 that reflects or deflects light signals from waveguide 101 to waveguide 102. The same total internal refraction or imaginary mirror effect will also cause optical signals traveling through second waveguide 102 to be reflected or deflected into first waveguide 101.

For the embodiment of the present invention shown in FIG. 2, current may flow from variable current source 106 through lead 108 to electrode heater 104 and return through electrical lead 110 to ground 112. The current flow through electrode heater 104 may be varied in accordance with teachings of the present invention to allow switch 100 to function as a variable optical attenuator. Waveguides 101 and 102, electrode heater 104, current source 106, electrical leads 108 and 110 and ground 112 may be formed on a substrate using conventional semiconductor fabrication techniques.

Figure 3:
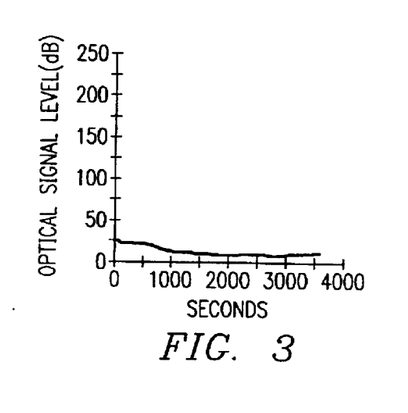
FIG. 3 is a graph showing optical output or signal level versus time measured at the drop port of the optical switch of FIG. 2 for a given current flow through the electrode heater.

FIG. 3 is a graph showing optical signal level versus time for a given current flow. For one example of an optical switch 111, optical signal level was measured at output end 101b of first guide 101 versus time in seconds at a substantially constant current flow through electrode heater 104. The current supplied to electrode heater 104 was maintained at approximately forty (40) milliamps for thirty six hundred (3600) seconds or sixty (60) minutes.

Figure 4:
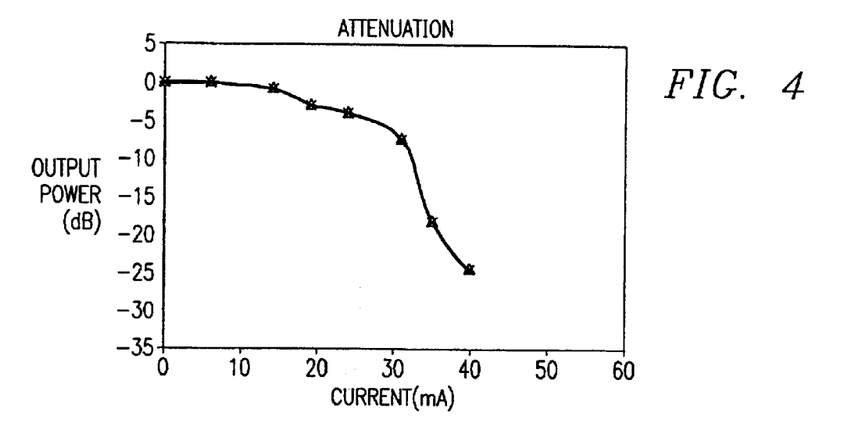
FIG. 4 is a graph showing attenuation of an optical signal measured at the drop port associated with the optical switch of FIG. 2.

FIG. 4 is a graph showing output power or signal level in decibels (dB) measured at output end 101b of waveguide 101 versus electrical current flow through electrode heater 104. An optical signal with constant power or signal level was supplied to input end 101b of waveguide 101 while the electric current flow to electrode heater 104 was varied in accordance with teachings of the present invention. As previously noted, the power level or signal level of an optical signal entering input end 101b of waveguide 101 is generally equal to the combined power level or signal level of optical signals exiting from output end 102b of waveguide 102 and output end 101b of waveguide 101. Therefore, a similar measurement of output power or signal level measured at output end 102b of waveguide 102 would be approximately the inverse of the graph shown in FIG. 4.

The graphical information shown in FIG. 4 demonstrates that for an optical switch such as optical switch 111, increasing current flow through electrode heater 104 may be used to attenuate or decrease the output power or signal level of an optical signal traveling between input end 101a to output end 101b of waveguide 100. In the same manner, the output power or signal level of the portion of the optical signal directed to output end 102b of waveguide 102 may be selectively increased. For this embodiment of the present invention, the attenuation of an optical signal at output end 101b or increase in optical signal at output end 102b is particularly significant between approximately twenty-two (22) milliamps and forty (40) milliamps.

As the current flow through electrode heater 104 is increased from zero to forty (40) milliamps, an increasing portion of an optical signal that enters input end 101a of waveguide 100 will be directed towards output end 102b of waveguide 102. The total sum of the optical signals exiting from output end 101b and output end 102b is generally equal to the signal level of the optical signal entering input end 101a. Therefore, an array of optical switches formed in accordance with teachings of the present invention may be used to control the signal level of each optical signal exiting from respective output end 102b and directed to respective fiber optic cables and/or waveguides 31a, 32a, 33a and 34a. By varying the current supplied to respective electrode heaters 104 of optical switches 100a, 100b, 100c and 100d, the output of each optical signal corresponding with wavelength $\lambda_1$, $\lambda_2$, $\lambda_3$ and $\lambda_4$ may be adjusted to approximately the same value. Thus, the signal levels of the optical signals returned to bi-directional multiple wavelength multiplexer/demultiplexer 40 are maintained substantially equal with each other.

Figure 5:
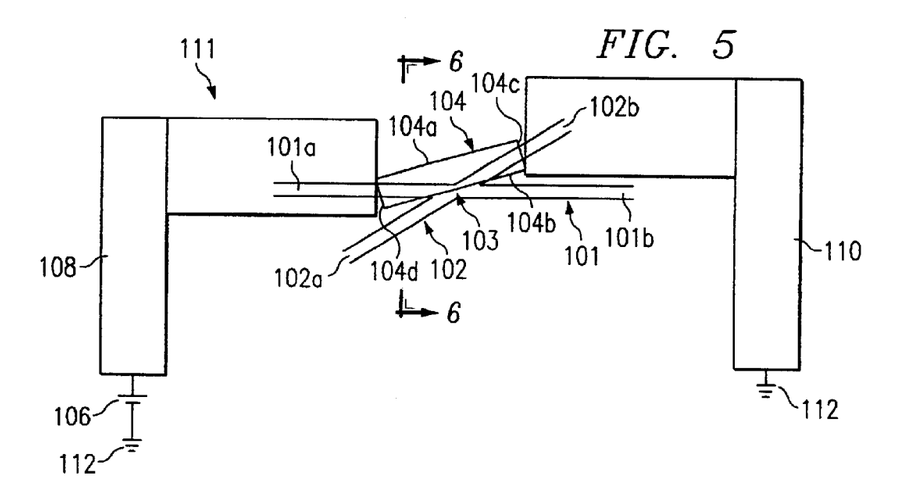
FIG. 5 is a schematic drawing showing a plan view of another embodiment of an optical switch satisfactory for use with the optical communication system of FIG. 1.

FIG. 5 is a schematic drawing showing additional details associated with one embodiment of optical switch 111. Examples of low resistance electrical leads 108 and 110 are shown in more detail. For the embodiment of the present invention as shown in FIG. 5, electrode heater 104 has a generally rectangular configuration defined in part by a pair of longitudinal edges 104a and 104b and a pair of lateral edges 104c and 104d. Longitudinal edges 104a and 104b may have a length of approximately two hundred fifty micrometers (250 μm). Lateral edges 104c and 104d may have a length of approximately ten micrometers (10 μm). The thickness of electrode heater 104 is preferably very small, almost zero, as compared with the thickness of first waveguide 101 and second waveguide 102.

Also depicted in FIG. 5 is that longitudinal edge 104b of electrode heater 104 is preferably disposed on a line that corresponds generally with the longitudinal center line of junction or intersection 103 between first waveguide 101 and second waveguide 102. For some applications, the vertical spacing or distance between electrode heater 104 and the corresponding junction or intersection 103 is approximately five micrometers (5 μm) and preferably within a range of plus or minus 0.5 μm. The lateral offset between longitudinal edge 104b of electrode heater 104 and the corresponding longitudinal center line of intersection 103 is preferably less than 9.5 μm. When the offset between electrode heater 104 and the respective intersection 103 exceeds these limits, desired heating of intersection or junction 103 and resulting internal reflection of an optical signal traveling therethrough may not occur as desired.

FIG. 6 shows one example of waveguides formed on a substrate using semiconductor fabrication techniques to produce an optical switching device incorporating teachings of the present invention. For the embodiment of the present invention shown in FIG. 6, substrate 116 may be part of a typical silicon wafer used in semiconductor fabrication. However, an optical switching device may be formed in accordance with teachings of the present invention on a wide variety of substrates and is not limited to use with only conventional silicon substrates.

For the embodiment of the present invention shown in FIG. 6, optical switch 100 preferably includes layer 118 disposed immediately adjacent to substrate 116. Layer 118 may be formed from various types of material such as silicon dioxide ($SiO_2$), or other materials such as Teflon AF 240. First waveguide 101 and second waveguide 102 may be formed from various types of material such as a combination of silicon dioxide and germanium oxide ($SiO_2$:$GeO_2$) with an index of refraction of approximately 1.4538. For some applications, layer 118 may have a thickness of approximately fifteen micrometers (15 μm) with an index of refraction of approximately 1.445.

Waveguides 101 and 102 are preferably formed on layer 118 and disposed in respective channels 115 and 117 formed in cladding layer 114. For one embodiment, channels 115 and 117 preferably have a generally rectangular cross section with dimensions in the range of approximately of six or seven micrometers (6 or 7 μm). Layer 114 may sometimes be referred to as "top cladding". Layer 114 may be formed from Teflon AF 1600 having an index of refraction of approximately 1.31. The thermooptic coefficient of many polymers is generally less than zero. As a result, when the temperature of such polymers is increased, the corresponding index of refraction is reduced. Teflon AF 1600 represents one example of a polymer having the desired thermooptic coefficient.

For other applications first layer 118 may be formed from silicon dioxide having a thickness of approximately 2.4 micrometers (2.4 μm). Second layer or top cladding 114 may be formed from polymeric material such as Ultradel 9021 having an index of refraction of approximately 1.526. Waveguides 101 and 102 may be formed from Ultradel 9120 having an index of refraction of approximately 1.5397.

For still other applications first layer 118 may be formed from Teflon AF 240 having an index of refraction of approximately 1.29. Second layer or top cladding 114 may be formed from Teflon AF 240 having an index of refraction of 1.29. The thickness of first layer 118 may be approximately five micrometers (5 μm). Waveguides 101 and 102 may be formed from Teflon AF 160 having an index of refraction of approximately 1.31.

Waveguides 101 and 102 may be formed from a wide variety of materials including polyimide, Teflon, PFCB, a mixture of silicon dioxide and polymer, ion exchange and polymer and fluorinated polyimide. Layer 114 may be formed from Ultradel polymer U 9120 having a refraction index of 1.5397 and waveguides 101 and 102 of Ultradel U 9020 having a refraction index of 1.526.

Figure 7A:
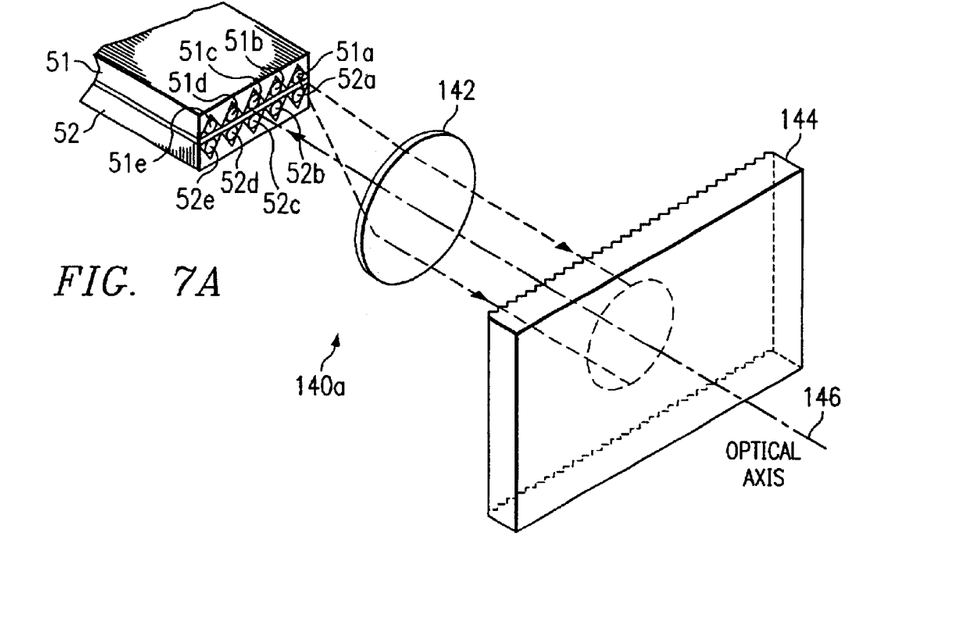
FIG. 7A is a schematic drawing showing an isometric view of a bi-directional wavelength division multiplexer/demultiplexer satisfactory for use with the optical communication system of FIG. 1.
Figure 7B:
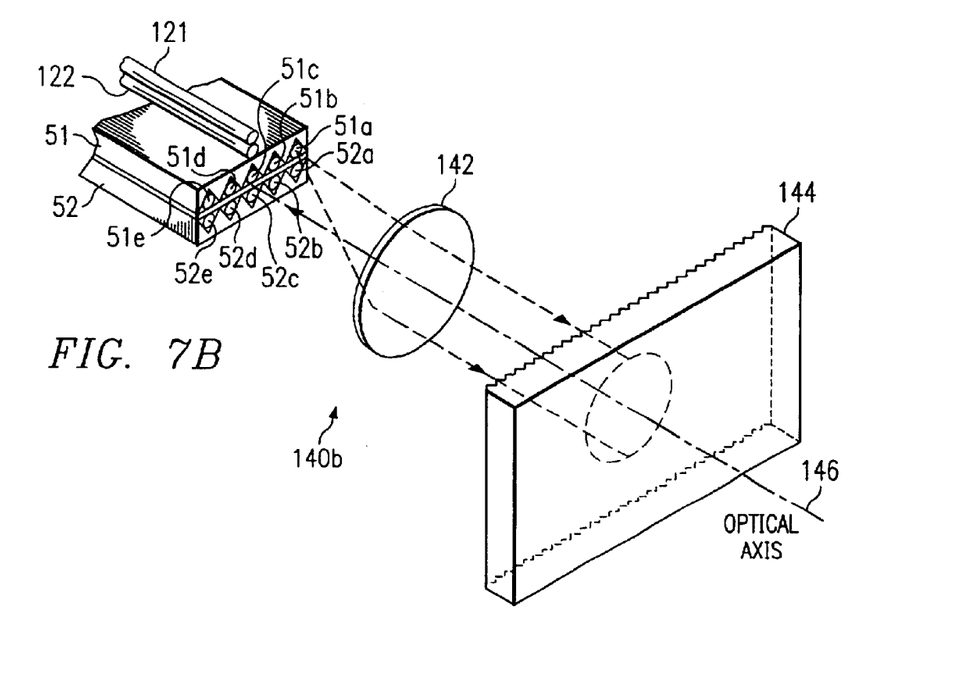
FIG. 7B is a schematic drawing showing an isometric view of an alternate embodiment of the bi-directional wavelength division multiplexer/demultiplexer depicted in FIG. 7A.

FIGS. 7A and 7B are schematic drawings showing portions of combined multiplexer/demultiplexers 140a and 140b, respectively, which may be satisfactorily used with communication systems 20 and/or 120. A combined multiplexer/demultiplexer incorporating teachings of the present invention may also be used with optical sensors and spectroscopy equipment. Optical components associated with combined multiplexer/demultiplexer 140a or 140b include fiber optic input cable 121 and fiber optic output cable 122, see FIGS. 7B and 8, which are respectively coupled with first waveguide array 51 and second waveguide array 52. Other optical components of combined multiplexer/demultiplexer 140 include light focusing device 142 and dispersion apparatus or diffraction grating 144.

Various types of reflective diffraction gratings and transmissive diffraction gratings may be satisfactorily used with a combined multiplexer/demultiplexer formed in accordance with teachings of the present invention. For some applications diffraction grating 144 may be a Littrow assembly or a Litmann Metcalf assembly or any other diffraction grating satisfactory for separating a multiple wavelength optical signal into selected spectral components and combining individual optical signals corresponding with selected spectral components into a multiple wavelength optical signal. Various types of dispersive elements in addition to diffraction gratings may also be used.

As illustrated in FIGS. 7A and 8, first waveguide array 51, second waveguide array 52, light focusing device 142 and diffraction grating 144 are preferably optically aligned with each other along optical axis 146. First waveguide array 51 and second waveguide array 52 are preferably symmetrically disposed with respect to optical axis 146. In an alternate embodiment, illustrated in FIG. 7B, substantially symmetric disposition of signal carriers or fiber cables 121, 122 and waveguide arrays 51, 52 may be achieved by aligning fiber cables 121, 122 and waveguide arrays 51, 52 on opposing sides of optical axis 146. As a result of aligning first waveguide array 51 and second waveguide array 52 with optical axis 146 as illustrated in FIGS. 7A and 8 or by aligning fiber cables 121, 122 and waveguide arrays 51, 52 as illustrated in FIG. 7B, combined multiplexer/demultiplexers 140a and 140b may substantially simultaneously demultiplex multiple wavelength optical signals received from fiber optic input cable 121 and multiplex respective optical signals into a multiple wavelength optical signal directed to fiber optic output cable 122. The present invention allows first waveguide array 51 and second waveguide array 52 to use common optical beam handling components and dispersion components such as light focusing device 142 and diffraction grating 144. For some applications, light focusing device 142 may include a single bi-convex lens or any other lens assembly operable to collimate diverging light or focus collimated light as desired. For some applications, diffraction grating 144 may have a blazed surface (not expressly shown).

For the embodiment of the present invention shown in FIGS. 7A and 8, input fiber 121 may be disposed at one end of first waveguide array 51 and output fiber 122 may be disposed at the same end of second waveguide array 52. Input fiber 121 is preferably located immediately adjacent to and disposed above output fiber 122. For the embodiment of the present invention shown in FIG. 7A, first waveguide array 51 and second waveguide array 52 may be formed by plurality of fiber optic cables disposed in respective "v" grooves. For other applications, as illustrated in FIGS. 7B and 8, first waveguide array 51 and second waveguide 52 may be formed using semiconductor fabrication techniques by placing a waveguide core in a respective waveguide channel. See also FIG. 6. The present invention allows fabricating multiple waveguide arrays, stacked relative to each other, using such semiconductor fabrication techniques.

For the embodiment of the present invention shown in FIGS. 7A and 8, a portion of input fiber optic cable 121 may be used to provide waveguide 51a. In a similar manner, a portion of output fiber optic cable 122 may be used to provide waveguide 52a. In a similar manner, as illustrated in FIG. 8, portions of fiber optic cables 31, 32, 33 and 34 may be used to provide respective waveguides 51b through 51e and 52b through 52e.

During operation of combined multiplexer/demultiplexer 140a, input fiber 121 may be used to communicate a multiple wavelength optical signal to input waveguide 51a. Light focusing device 142 and diffraction grating 144 cooperate with each other to reflect and disperse the multiple wavelength optical signals emitted from input waveguide 51a into selected spectral components directed to respective waveguides 52b through 52e of second waveguide array 52, preferably employing inverse symmetry. For the embodiment shown in FIGS. 7A and 8, second waveguide array 52 in combination with light focusing device 142 and diffraction grating 144 function as a demultiplexer.

Combined multiplexer/demultiplexer 140b of FIG. 7B operates in a similar manner. For example, a signal may be received by light focusing device 142 from input cable 121. Light focusing choice 142 may then direct the multiple wavelength signal to dispersion apparatus or diffraction grating 144. At diffraction grating 144, the optical signal is preferably diffracted into a plurality of selected spectral components and reflected back to light focusing device 142. Light focusing device 142 then preferably directs the spectral components to one or more waveguides or waveguide arrays. The waveguides or waveguide arrays then preferably perform one or more signal processing operations, e.g., multiplexing, demultiplexing, attenuation, adding, dropping, etc., on the spectral components. In one embodiment, one or more processed signals may be communicated by cable 121 or 122.

As another operating example, input fiber 121 could be an input from a telecommunications line that contains many different wavelength channels. The signals from the different channels would be reflected and dispersed across the bottom row of receiving fibers in array 52. The different wavelength signal of each channel would go into a different fiber in array 52 to be separated or demultiplexed. In an opposing manner, the array 51 could be simultaneously used to recombine all the different wavelengths from individual channels, one in each fiber, by the dispersion and reflection from the diffraction grating on to output fiber 122. The recombined signals would be sent out on output fiber 122 (multiplexed); thus, making a combination multiplexer/demultiplexer in one module.

Respective optical signals from other sources such as optical switches 100a, 100b, 100c and 100d may be coupled with waveguides 51b through 51e of first waveguide array 51. Light focusing device 142 and diffraction grating 144 preferably cooperate with each other to combine or multiplex respective optical signals from waveguides 51b through 51e of first waveguide array 51 into a multiple wavelength optical signal. Light focusing device 142 directs the multiple wavelength optical signal to output waveguide 52a of second waveguide array 52 again employing inverse symmetry. Signals from sources other than switches 100 may be coupled with waveguides 51b through 51e of first waveguide array 51 and multiplexed by dispersion and reflection from diffraction grating 144 into a multiple wavelength optical signal that is directed to output waveguide 52a of second waveguide array 52.

By positioning and forming first waveguide array 51 and second waveguide array 52 based on inversion symmetry with respect to optical axis 146 or by providing inversion symmetry between signal carriers 121, 122 and waveguide arrays 51, 52, imaging and reflection from diffraction grating 144 allows substantially simultaneous multiplexing and demultiplexing of multiple wavelength optical signals. The present invention is not limited to only a first waveguide array and a second waveguide array or a first input cable and a second input cable. Multiple multiplexing and demultiplexing functions may be satisfactorily formed by disposing any desired number of waveguide arrays and signal carriers, with appropriate inversion symmetry, relative to a light focusing device, a dispersion device and the associated optical axis.

Although the present invention has been described with respect to a specific preferred embodiment thereof, various changes and modifications may be suggested to one skilled in the art and it is intended that the present invention encompass such changes and modifications fall within the scope of the appended claims.

What is claimed is:

1. A communication system for multiple wavelength optical signals comprising:
   a combined multiplexer/demultiplexer operable to substantially simultaneously multiplex and demultiplex multiple wavelength optical signals; and
   an array of optical switches operably coupled to the combined multiplexer/demultiplexer, the optical switches operable to switch optical signals corresponding with selected wavelengths.

2. The communication system of claim 1 wherein the combined multiplexer/demultiplexer further comprises multiple waveguide arrays substantially symmetrically disposed relative to an optical axis of the combined multiplexer/demultiplexer.

3. The communication system of claim 2 further comprising:
   the light focusing device operable to receive the selected spectral wavelengths from the diffraction grating and to direct each spectral wavelength to a respective waveguide in the second waveguide array; and
   the light focusing device operable to receive a respective optical signal from the waveguides of the first waveguide array and to direct each optical signal to the diffraction grating.

4. The communication system of claim 1 further comprising the optical switches operable to a selectively attenuate a respective optical signal communicated by each optical switch.

5. The communication system of claim 4 further comprising the first waveguide and second waveguide associated with each optical switch intersecting at an angle ranging from approximately two degrees (2°) to approximately eight degrees (8°).

6. The communication system of claim 1 further comprising the optical switches operable to attenuate selected optical signals.

7. The communication system of claim 1 wherein the combined multiplexer/demultiplexer further comprises at least a first waveguide array and a second waveguide array.

8. The communication system of claim 1 wherein each optical switch further comprises:
   a first waveguide intersecting a second waveguide to form a junction; and
   an electrode heater disposed adjacent to the junction.

9. The communication system of claim 1 wherein the combined multiplexer/demultiplexer further comprises:
   a first waveguide array and a second waveguide array with an input fiber optic cable coupled with the first waveguide array and an output fiber optic cable coupled with the second waveguide array;
   at least one light focusing device and a diffraction grating disposed proximate the first and second waveguide arrays;
   the diffraction grating generally aligned with the light focusing device and operable to diffract a multiple wavelength optical signal into selected spectral wavelengths; and
   the light focusing device operable to receive a multiple wavelength optical signal from the first waveguide array and operable to direct a multiple wavelength optical signal to at least the second waveguide array.

10. The communication system of claim 1 further comprising:
    an add port operably coupled to at least one optical switch; and
    a drop port operably coupled to at least one optical switch.

11. A signal processing system comprising:
    a plurality of waveguide arrays disposed substantially symmetrically relative to an optical axis of the system, each waveguide array having a plurality of waveguides disposed therein;
    an array of optical switches operably coupled to a plurality of the waveguides, the optical switches operable to selectively direct optical signals carried by the waveguides; and
    the plurality of waveguides operable to substantially simultaneously perform at least one signal processing operation on at least one optical signal reflected from a dispersion apparatus.

12. The signal processing system of claim 11 wherein the optical switches further comprise:
    selected waveguides intersecting at an angle to form a junction, the angle of intersection ranging from approximately two degrees (2°) to approximately eight degrees (8°); and
    an electrode heater disposed adjacent to each junction for heating the junctions to switch at least a portion of the optical signals from one waveguide to another using internal reflection.

13. The signal processing system of claim 12 wherein the angle of intersection is approximately three degrees (3°).

14. The signal processing system of claim 11 further comprising:
    a first waveguide array operable to multiplex the optical signal reflected from the dispersion apparatus;
    a second waveguide array operable to demultiplex the optical signal reflected from the dispersion apparatus; and wherein
    the signal processing operations of multiplexing and demultiplexing occur substantially simultaneously.

15. The signal processing system of claim 11 further comprising:
    an input signal carrier and an output signal carrier operably associated with respective waveguide arrays;
    a light focusing device disposed proximate the waveguide arrays;
    the light focusing device operable to receive an optical signal from the input signal carrier, direct the optical signal to the dispersion apparatus, and direct spectral wavelengths of the optical signal reflected from the dispersion apparatus back to the waveguide arrays; and
    the output signal carrier operable to transmit at least one optical signal processed by the waveguide arrays.

16. A system for communicating multiple wavelength optical signals comprising:
- a substrate having a plurality of waveguide arrays disposed thereon, each respective waveguide array having a plurality of waveguides included therein, the waveguides defined in part by a core disposed in a channel formed in a layer of cladding disposed on the substrate;
- at least one signal carrier associated with each waveguide array;
- the waveguide arrays and the signal carriers substantially symmetrically disposed relative to an optical axis of the system;
- selected pairs of waveguides intersecting with each other to form a junction;
- an electrode heater disposed adjacent to each junction for heating the junction to switch at least a portion of a selected optical signal from one waveguide to another using internal reflection;
- a dispersion apparatus disposed proximate the waveguide arrays and aligned along the optical axis, the dispersion apparatus operable to receive an optical signal from at least one signal carrier, disperse the optical signal into a plurality of spectral wavelengths and reflect the spectral wavelengths back to the waveguide arrays; and
- the respective waveguide arrays operable to perform at least one signal processing operation on selected ones of the reflected spectral wavelengths.

17. The system of claim 16 further comprising a light focusing device disposed between the waveguide arrays and the dispersion apparatus along the optical axis, the light focusing device operable to receive optical signals from at least one signal carrier, direct the optical signals to the dispersion apparatus, receive the reflected spectral wavelengths and direct the spectral wavelengths to at least one waveguide array.

18. The system of claim 16 further comprising a plurality of the waveguide arrays operable to multiplex the spectral wavelengths.

19. The system of claim 16 further comprising a plurality of the waveguide arrays operable to demultiplex the spectral wavelengths.

20. The system of claim 16 further comprising:
- at least one of the waveguide arrays operable to multiplex the spectral wavelengths; and
- at least one of the waveguide arrays operable to demultiplex the spectral wavelengths.

21. The system of claim 16 further comprising the signal carriers aligned with the waveguides of the waveguide arrays.

22. The system of claim 16 further comprising the signal carriers and the waveguide arrays substantially symmetrically disposed on opposing sides of the optical axis.

23. The system of claim 16 further comprising:
- a drop port operably coupled to at least one waveguide junction; and
- the electrode heater operable to attenuate the optical signal using internal reflection to direct a portion of the optical signal to the drop port.

24. The system of claim 16 further comprising:
- an add port operably coupled to at least one waveguide junction; and
- the electrode heater operable to alter contents of the optical signal using internal reflection to direct a portion of an optical signal from the add port to the optical signal on a selected waveguide.

25. An optical communication system comprising:
- a plurality of waveguide arrays, each waveguide array having a plurality of waveguides disposed therein;
- a signal carrier operably coupled to each waveguide array, the waveguide arrays and the signal carriers substantially symmetrically disposed relative to an optical axis of the system;
- an array of optical switches operably coupled to at least a portion of the plurality of the waveguides;
- an add port and a drop port operably coupled to each switch;
- a light focusing device disposed along the optical axis, proximate the waveguide arrays;
- a dispersion apparatus disposed along the optical axis, proximate the light focusing device;
- the light focusing device operable to receive an optical signal from at least one signal carrier, direct the optical signal to the dispersion apparatus for diffraction of the optical signal into its spectral components and reflection of the spectral components and the light focusing device further operable to direct the spectral components back to the waveguide arrays;
- the waveguide arrays operable to substantially simultaneously process selected spectral components;
- the switches operable to selectively switch at least one processed spectral component to a signal carrier for communication; and
- the add ports and the drop ports cooperating with the switches to selectively modify at least one optical signal carried by the waveguides.

26. The optical communication system of claim 25 further comprising:
- at least one waveguide array operable to demultiplex optical signals; and
- at least one waveguide array operable to multiplex optical signals.

27. The optical communication system of claim 26 further comprising at least one signal carrier operable to communicate the multiplexed signal.

28. The optical communication system of claim 26 further comprising at least one signal carrier operable to communicate the demultiplexed signal.

29. The optical communication system of claim 25 further comprising the waveguides including multi-mode fibers operable to absorb a plurality of spectral components reflected from the dispersion apparatus.

30. The optical communication system of claim 25 further comprising:
- the optical switches formed from junctions created at intersecting waveguides; and
- electrode heaters disposed proximate the junctions.

* * * * *

UNITED STATES PATENT AND TRADEMARK OFFICE
CERTIFICATE OF CORRECTION

| | | |
|---|---|---|
| PATENT NO. | : 7,103,244 B2 | Page 1 of 1 |
| APPLICATION NO. | : 10/097680 | |
| DATED | : September 5, 2006 | |
| INVENTOR(S) | : Chen et al. | |

It is certified that error appears in the above-identified patent and that said Letters Patent is hereby corrected as shown below:

Column 6
Line 50, change "$80_2$" to --$\lambda_2$--

Column 8
Line 11, change ", see FIG. 6," to --(see FIG. 6)--

Signed and Sealed this

Seventeenth Day of July, 2007

JON W. DUDAS
*Director of the United States Patent and Trademark Office*